United States Patent [19]

Luetzelschwab

[11] Patent Number: 4,633,947

[45] Date of Patent: Jan. 6, 1987

[54] PRODUCTION OF A POLYACRYLAMIDE SOLUTION USED IN AN OIL RECOVERY PROCESS

[75] Inventor: Wayne E. Luetzelschwab, Littleton, Colo.

[73] Assignee: Marathon Oil Company, Findlay, Ohio

[21] Appl. No.: 737,317

[22] Filed: May 23, 1985

[51] Int. Cl.$^4$ .................. E21B 33/138; E21B 43/22
[52] U.S. Cl. ............................. 166/252; 166/273; 166/274; 166/275; 166/295; 252/8.554; 524/827
[58] Field of Search ............... 166/75.1, 252, 273, 166/274, 275, 295, 305.1; 252/8.55 D; 523/130; 524/827

[56] References Cited

U.S. PATENT DOCUMENTS

| | | | |
|---|---|---|---|
| 2,827,964 | 3/1958 | Sandiford et al. | 166/9 |
| 3,039,529 | 6/1962 | McKennon | 166/9 |
| 3,370,649 | 2/1968 | Wolgemuth | 166/9 |
| 3,467,187 | 9/1969 | Gogarty et al. | 166/273 |
| 3,558,759 | 1/1971 | Sarem | 264/142 |
| 3,825,067 | 7/1974 | Vestal | 166/274 X |
| 4,254,249 | 3/1981 | Cottrell et al. | 252/8.55 D X |
| 4,395,340 | 7/1983 | McLaughlin | 252/8.55 D |
| 4,401,789 | 8/1983 | Gideon | 524/827 |
| 4,433,727 | 2/1984 | Argabright et al. | 166/252 |
| 4,461,352 | 7/1984 | Falk | 523/130 X |

Primary Examiner—George A. Suchfield
Attorney, Agent, or Firm—Jack L. Hummel; Rodney F. Brown

[57] ABSTRACT

A process for producing an aqueous partially hydrolyzed polyacrylamide solution employed to recover oil from a subterranean oil-bearing formation. The properties of viscosity and screen factor for an aqueous polymer solution are correlated to the polymerization reaction parameters. Values of the parameters are selected which correlate to the specific predetermined polymer properties capable of meeting the performance demands of the formation and the aqueous partially hydrolyzed polyacrylamide solution is produced at the selected values of the reaction parameters.

18 Claims, 7 Drawing Figures

PRODUCTION OF A POLYACRYLAMIDE SOLUTION USED IN AN OIL RECOVERY PROCESS

BACKGROUND OF THE INVENTION

1. Technical Field

The present invention relates to a process for recovering oil from an oil-bearing subterranean formation and in particular to a process wherein an aqueous partially hydrolyzed polyacrylamide solution produced under controlled conditions is employed to recover oil from the formation.

2. Background Information

Aqueous solutions of partially hydrolyzed polyacrylamide (PHPA) are commonly used in oil recovery processes. For example, U.S. Pat. Nos. 2,827,964 to Sandiford et al and 3,039,529 to McKennon teach the use of an aqueous PHPA solution as an oil-displacing drive fluid and U.S. Pat. No. 3,467,187 to Gogarty et al teaches its use as a mobility buffer for a micellar displacement fluid.

A number of processes for producing dilute PHPA solutions which may be used in the above-cited oil recovery processes are likewise well known. For example, U.S. Pat. Nos. 3,558,759 to Sarem, 3,370,649 to Wolgemuth and 4,433,727 to Argabright et al teach polymerization processes for manufacturing PHPA solutions. These patents disclose a broad range of values for polymerization parameters wherein the processes are operable. Thus far, however, PHPA manufacturers have had to resort to trial and error when selecting specific values of polymerization reaction parameters to effectively produce dilute PHPA solutions having predetermined properties because the sensitivity of these properties to variations in the polymerization reaction parameters within known operable ranges has not been recognized. Unfortunately, this haphazard approach is unsatisfactory because quality control and reproducibility of the PHPA product are difficult to achieve.

SUMMARY OF THE INVENTION

The present invention accurately and efficiently produces a PHPA solution having desirable predetermined properites for use in an oil recovery process. The process first predetermines the required properties of a polymer solution for a given application. The polymer solution properties are then correlated to identified polymerization reaction parameters used in the manufacture of the polymer solution. A value or range of values for each identified parameter which will produce a polymer solution having the desirable predetermined properties is systematically selected using the correlations. Finally, the polymer solution having these properties is manufactured according to the selected values of the parameters.

More specifically, the present invention recognizes that the polymer properties of screen factor and viscosity, which are critical properties of a dilute polymer solution used in oil recovery applications, are a function of certain polymerization reaction parameters. These parameters are identified as monomer concentration, initiator level and reaction temperature. Therefore, the functional correlations between these polymerization reaction parameters and the dilute polymer solution properties of screen factor and viscosity are determined. From the correlations, values of the parameters are selected to produce a dilute polymer solution having desirable predetermined properties. The desirable properties of the final dilute polymer solution are predetermined on the basis of the performance demands of a subterranean oil-bearing formation wherein the dilute polymer solution is to be injected for an oil recovery process. The performance demands themselves, which are a function of specific properties of the formation rock, e.g. permeability, can be determined experimentally via laboratory and/or field tests known in the art.

In addition to selecting the values of the polymerization reaction parameters based on their correlations to predetermined dilute polymer solution properties, values of the reaction parameters are also constrained to ranges which result in practical operability of the polymerization, hydrolysis and dilution sequences comprising the process of producing the dilute polymer solution. That is, the selected values of the reaction parameters must be within ranges wherein the total polymerization reaction time is practical and the concentrated polymer solution initially obtained from the polymerization or subsequent hydrolysis reactor is reasonably handleable. By reasonably handleable, it is meant that the concentrated polymer solution is sufficiently fluid to enable practical pumping of it between process steps via pipelines and to enable subsequent dilution of it.

The present invention enables one to design a polymerization process relatively quickly and inexpensively which can produce a polymer solution having properties sufficient to meet the performance demands of the formation of interest. Furthermore, if it becomes necessary to produce a dilute polymer solution having properties different than those contemplated by the original design, e.g., because of an improved understanding of the formation of interest, changed performance demands in the formation of interest or a desire to use the manufactured polymer solution in a different formation, changes in the dilute polymer solution properties can be effected simply by varying the process parameters. Thus, one can produce a dilute polymer solution having new properties with existing polymerization equipment and without significant and expensive modification. The invention allows one to fine tune values of the polymerization reaction parameters for given process equipment to produce a polymer solution of consistent and repeatable quality.

DESCRIPTION OF THE PREFERRED EMBODIMENTS

Figure 1:
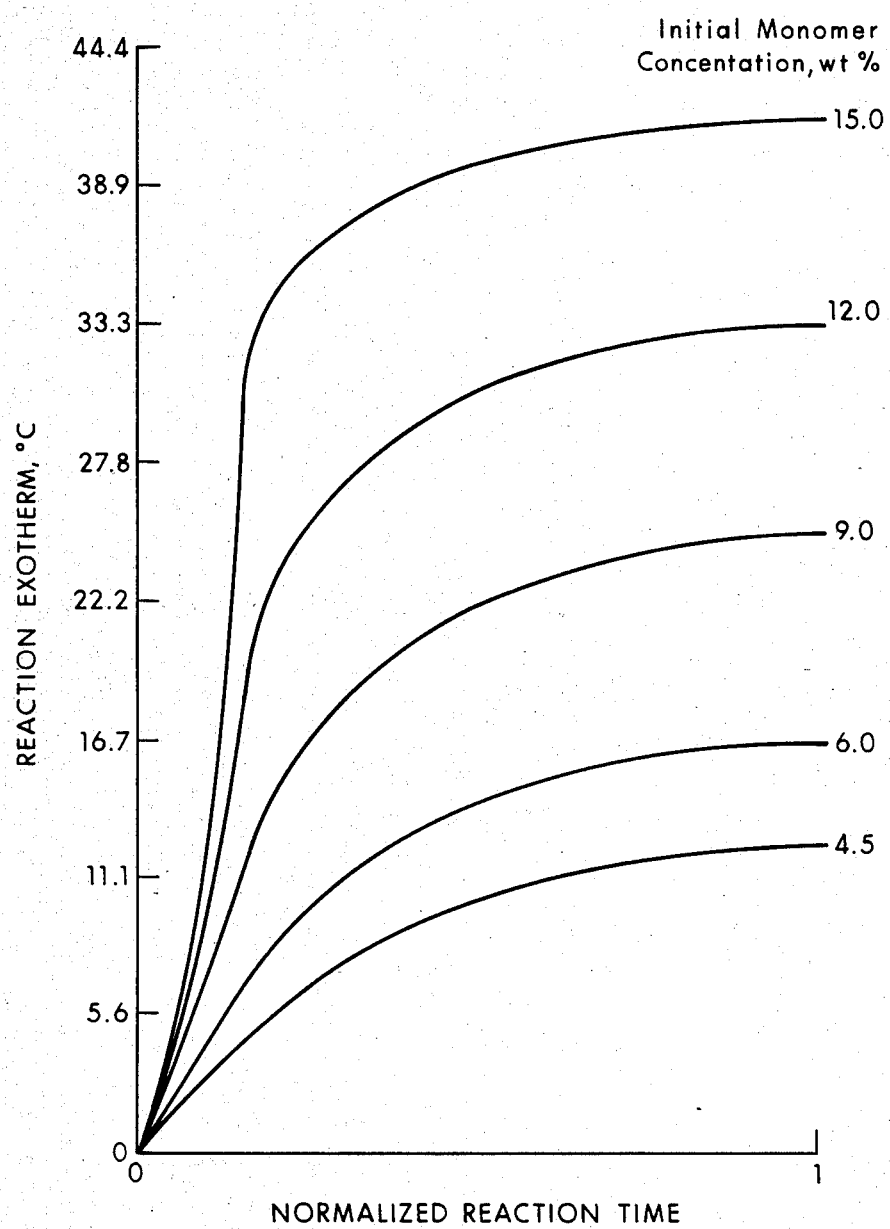
FIG. 1 is a plot of the reaction exotherm versus normalized time for different monomer concentrations.

According to the present invention, a concentrated polyacrylamide solution is produced which is partially hydrolyzed. The resulting concentrated partially hydrolyzed polyacrylamide (PHPA) solution is diluted to obtain a dilute PHPA solution having predetermined properties capable of meeting the performance demands of a subterranean oil-bearing formation. These objectives are achieved by identifying the relevant polymerization reaction parameters, selecting appropriate values of the parameters based on their correlation to dilute polymer solution properties and the practical operability of the manufacturing process, and producing the polymer solution accordingly. Specifically, it has been discovered that the polymerization reaction parameters of monomer concentration, initiator level and reaction temperature are correlated to the dilute polymer solution properties of viscosity and screen factor. These properties in turn determine the performance of the dilute polymer solution in oil recovery applications.

Concentrated polymer solution, as used herein, refers to the polymer solution either before or after partial hydrolysis, but before a separate dilution step. Dilute polymer or PHPA solution refers to the polymer solution after a separate dilution step. The polymer concentration of the concentrated polymer solution is generally from about 3 to about 15 percent by weight (wt %) while the dilute polymer solution is generally from about 50 ppm to about 4 wt %.

Practical operability of the polymer manufacturing process is defined to encompass reasonable polymerization reaction times and handleability of the concentrated polymer solution. A reasonable total reaction time for the acrylamide monomer to essentially completely react to form the concentrated polyacrylamide solution is up to about 24 hours. For reaction times greater than 24 hours there is a high risk of forming undesirable water-insoluble, solid phase polyacrylamide known as popcorn polymer which must be filtered from the polymer solution.

Viscosity, which is correlated to the concentration and molecular weight properties of the polymer in solution, may be used as a measure of the handleability of the concentrated polymer solution. Viscosity of the concentrated polymer solution is measured by two techniques; one applies to the viscosity of the solution under unrestricted pipeline flow conditions and the other to the viscosity under constricted flow conditions, e.g., through valves, pumps, static mixers, etc. Generally polymer solutions having a concentration above abou 15 wt %, where the average molecular weight of the polymer in solution is from about 5 to about 15 million, are too viscous to be practically handleable. Of course lower molecular weight polymers in solution may be handleable at higher concentrations.

The procedure for selecting values of the polymerization reaction parameters in the manner described below expressly utilizes the dilute PHPA solution properties as the selection criteria. However, the practical operability of the polymer solution production process is always an implicit criterion for selecting values of the parameters because an impractical production process is inherently undesirable.

The first step in the process of the present invention is to predetermine the values for viscosity and screen factor of a dilute PHPA solution which will satisfy the performance demands of a formation of interest when the aqueous PHPA solution is used in an oil recovery process, e.g., as a mobility buffer in a surfactant flood, a drive fluid in a polymer or polymer/caustic flood, or a gel component in vertical conformance control. U.S. Pat. No. 4,433,727 to Argabright et al discloses one particular method of performing this step for flooding processes using laboratory core flood data and, as such, is incorporated herein by reference. This step may also be performed by other methods known in the art using field test and/or core flood data.

Accordingly, the next step is to select the values of the polymerization reaction parameters based on the predetermined properties of the PHPA solution. This is followed by actual manufacture of the PHPA according to the selected reaction parameters. U.S. Pat. No. 4,433,727 to Argabright et al discloses the operational units of a polymerization process which could be used in the present invention to manufacture the PHPA. A concentrated PHPA solution is produced which generally is diluted by the addition of an aqueous diluent before it is utilized in an oil recovery application. The degree of dilution is a function of the particular application for the dilute PHPA solution. For flooding applications, the PHPA solution is generally diluted to a PHPA concentration of about 50 to about 10,000 ppm. For vertical conformance control applications, the dilution range can be as high as 4.0 wt %. In some vertical conformance control applications, the concentrated solution can be used directly without dilution. The aqueous diluent may be a brine, fresh water or even deionized water. In practice, brine is generally the most available diluent. The resulting dilute PHPA solution is injected into the formation to facilitate oil recovery therefrom.

The following are practical ranges of interest, from which values of the parameters are selected: initial monomer concentration is about 3 to about 15 wt %; initial initiator level is about 50 to about 3000 ppm; and initial reaction temperature is about 10 to about 77° C. The monomer concentration is based on the total weight of the reactor contents. The monomer concentration decreases from its initial value as it is converted to polymer in the reactor. The initiator level is the concentration of initiator in the reactor based on the monomer concentration in the reactor. The initial initiator concentration in the reactor is a large stoichiometric excess of that required for substantially complete reaction of the monomer. Thus, the initiator level increases as the reaction progresses because the initiator concentration relative to monomer concentration increases. The reaction temperature is the temperature of the reactor contents. It increases from its initial value as the reaction rate increases since the reaction is exothermic.

In gross terms, the reaction parameters correlate to reaction rate and dilute PHPA properties of screen factor and viscosity as follows: increasing the monomer concentration increases the reaction rate and increases dilute PHPA screen factor and viscosity; decreasing the initiator level decreases the reaction rate and increases the screen factor and viscosity; and increasing the temperature increases the reaction rate but decreases the screen factor and viscosity. The reaction rate is usually considered in selecting values of the reaction parameters, only to the extent that values of the parameters are not selected which result in an impractical, extremely slow polymerization rate. Subject to this qualification, reaction rate is not a significant consideration when selecting reaction parameter values.

The degree to which the reaction parameters affect dilute PHPA properties varies greatly and is of primary importance to selecting values of the reaction parameters. However, the gross correlations above are insufficient by themselves to enable one to select values of the polymerization reaction parameters in the manner of the present invention. Several unexpected, but significant effects exist among the parameters which must be considered to accurately select values of the reaction parameters. These effects are discussed below.

Particularly unexpected is the discovery that discontinuities or "breakpoints" occur in the correlation functions relating the reaction parameters to dilute PHPA properties. At an average reaction temperature of 49° C., a breakpoint in the initiator level correlation functions occurs at about 500 ppm initiator level. For values of initiator level below the breakpoint, the properties of screen factor and viscosity are extremely sensitive to variations in the initiator level and can be increased significantly. For values of initiator level above the breakpoint, the dilute PHPA properties are relatively insensitive to variations in the initiator level. A dilute PHPA can be produced having a significantly higher screen factor and viscosity by operating at values of initiator level below the breakpoint than above the breakpoint.

A breakpoint also occurs in the correlation function between initial reaction temperature and dilute PHPA properties. Although dilute PHPA properties generally increase as initial reaction temperature decreases, dropping the initial reaction temperature to values below the range of about 32° to 49° C., quite unexpectedly has very little effect on or even decreases dilute polymer properties. Thus, it is preferable to operate at values of initial reaction temperature near the breakpoint.

Finally, variations in monomer concentration have a very strong effect on polymer properties within a range of about 4.5 to about 7.5 wt %. Dilute polymer properties are substantially constant in a monomer concentration range above about 7.5 wt %.

Other noteworthy effects are the cross-correlation or interdependence between reaction temperature and initiator level such that reaction temperature has a stronger effect on polymer properties as the initiator level decreases. The reaction sustains a maximum rate for the longest duration when the initial monomer concentration is between about 4.0 to 7.0 wt %. Reaction pH, when maintained, within a range of about 5.0 to about 10.5, has little effect on dilute polymer properties; they have been observed to increase only slightly as pH increases within this range.

Practice of the invention is best illustrated by specific examples. For this reason, the following examples are presented. However, they are not to be construed as limiting the scope of the invention.

EXAMPLE 1

Acrylamide monomer is polymerized using an ammonium persulfate initiator in a polymerization reactor. Several runs are conducted at different initial monomer concentrations. The exotherm (instantaneous reactor temperature minus initial reactor temperature) is plotted as a function of normalized time (actual time/time to completion) in FIG. 1. The result is a family of curves for runs at the different initial monomer concentrations.

An initial monomer concentration between about 4.0 and 7.0 wt % optimizes the polymerization reaction rate because the maximum rate is maintained across this range. Reactions having an initial monomer concentration above this range have an S-shaped curve, starting slowly and only passing through the maximum rate after sufficient monomer is converted to reach a monomer concentration of about 7.0 wt %.

EXAMPLE 2

Figure 2:
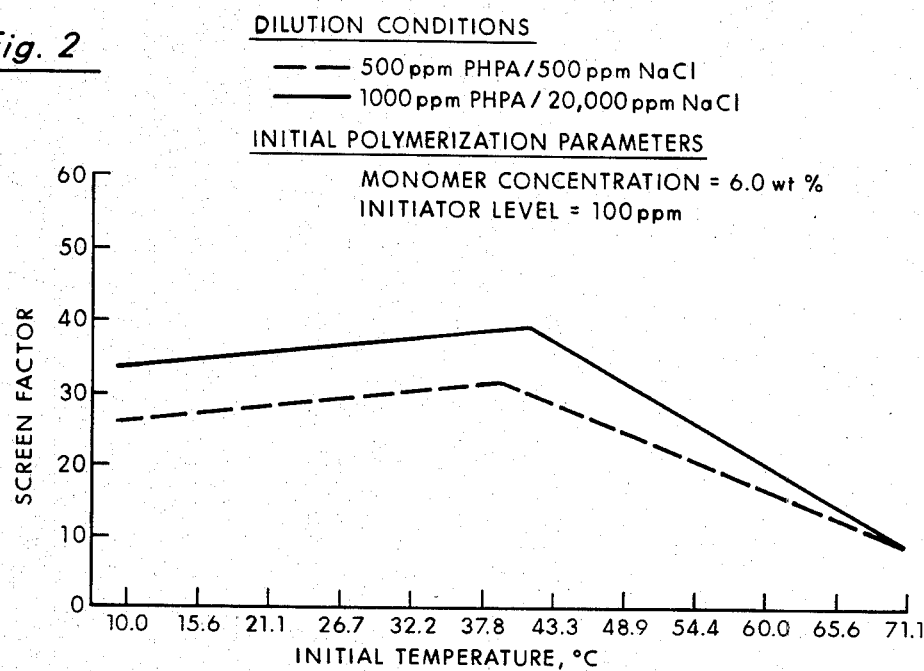
FIG. 2 is a plot of dilute PHPA screen factor versus initial reaction temperature for two types of dilution water at constant initial monomer concentration and initiator level.
Figure 3:
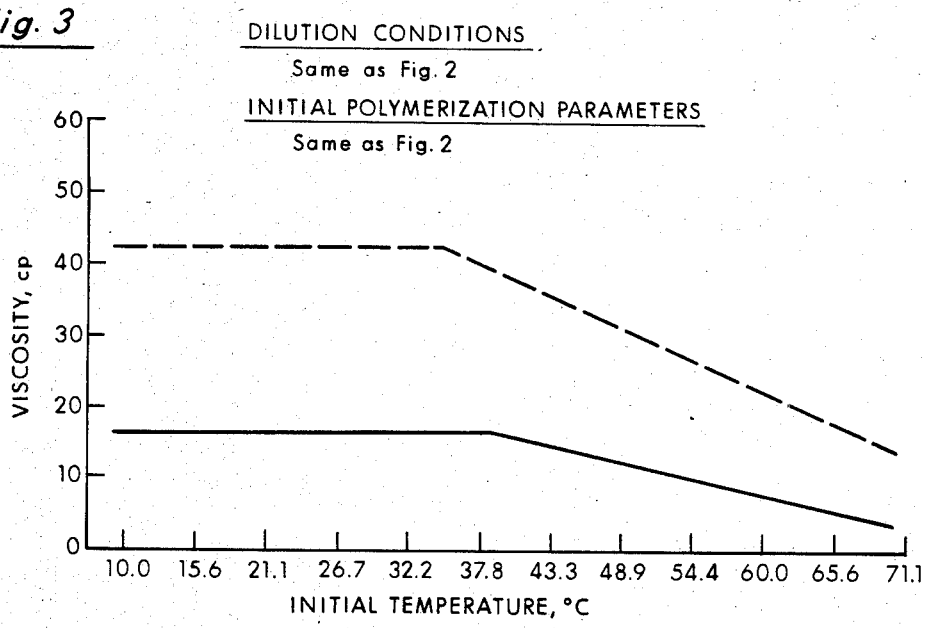
FIG. 3 is a plot of dilute PHPA viscosity versus initial reaction temperature for two types of dilution water at constant initial monomer concentration and initiator level.
Figure 4:
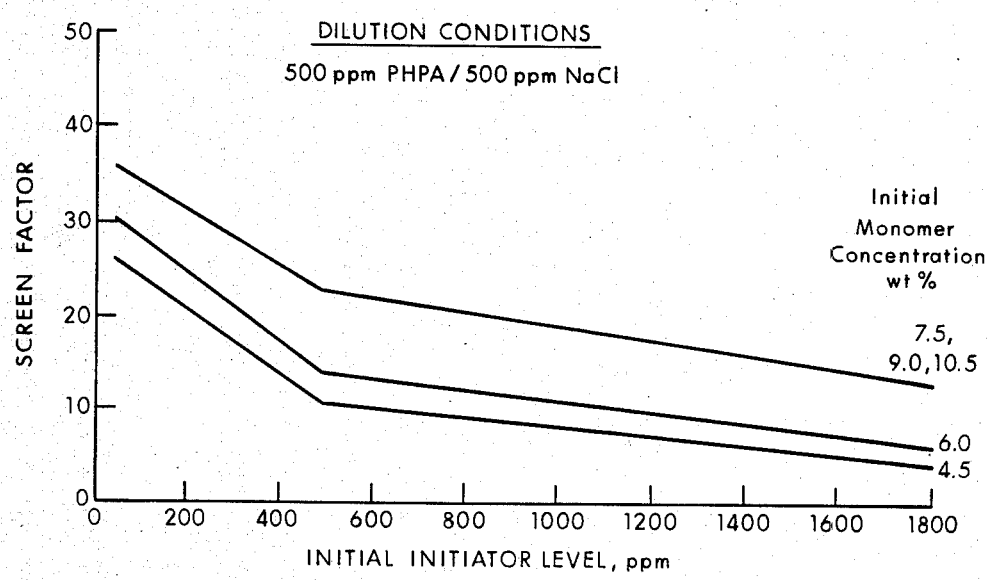
FIGS. 4 and 5 are plots of dilute PHPA screen factor versus initiator level for different initial monomer concentrations and fixed dilution conditions.
Figure 5:
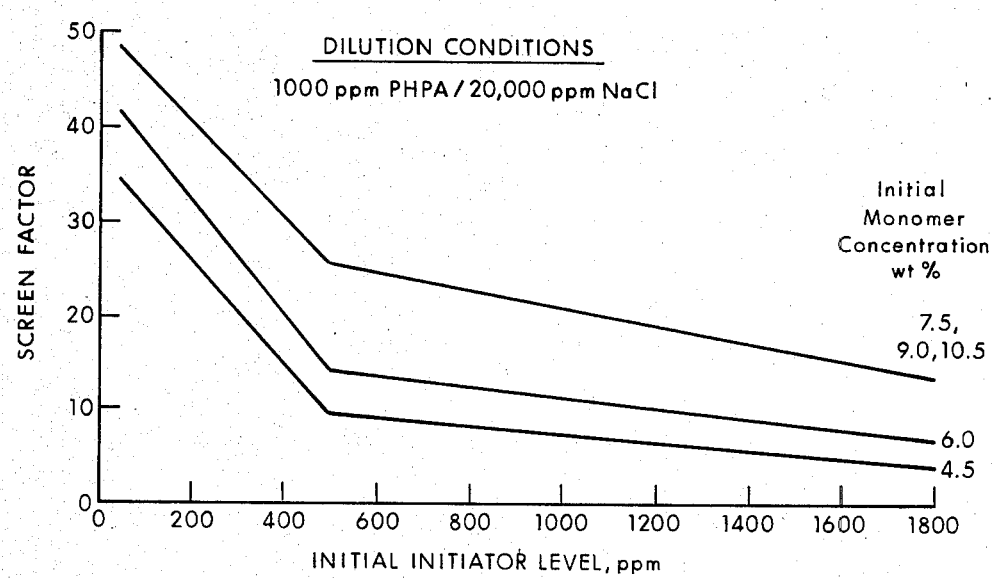
Figure 6:
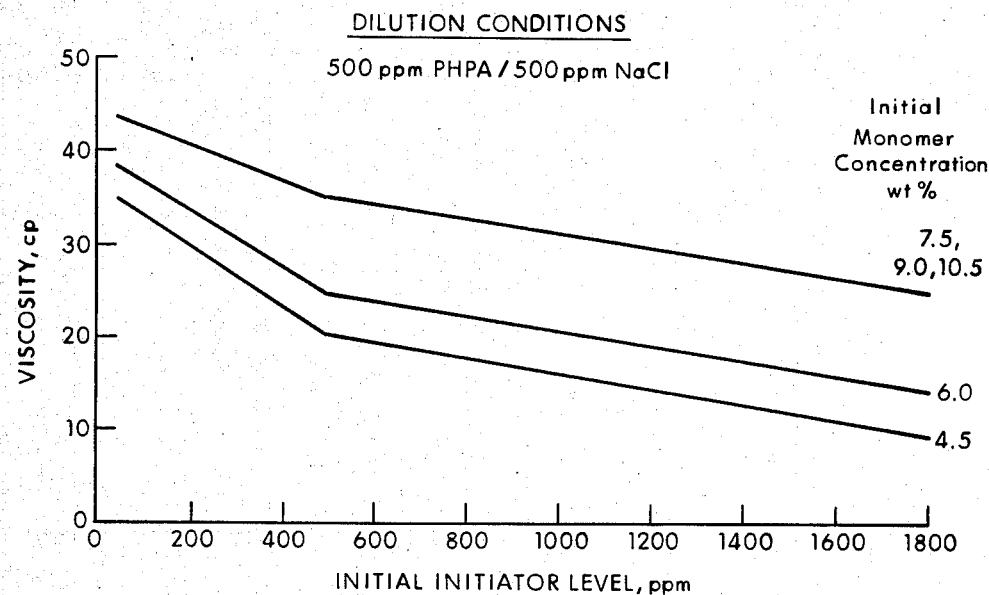
FIGS. 6 and 7 are plots of dilute PHPA viscosity versus initiator level for different initial monomer concentrations and fixed dilution conditions.
Figure 7:
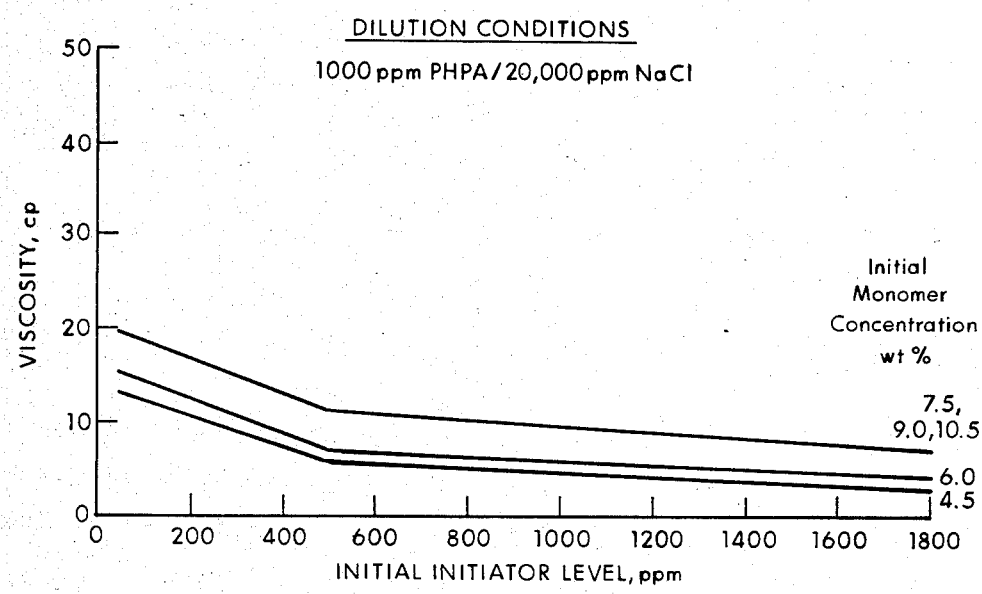

PHPA solutions are manufactured by polymerizing acrylamide monomer using ammonium persulfate initiator in a reactor. The resulting concentrated polymer solution is partially hydrolyzed and diluted to obtain 1.0 wt % PHPA solutions. One or more of the initial reaction parameters of initiator level and temperature are varied with each run while monomer concentration is held constant at 6.0 wt %. The PHPA solutions so produced are further diluted to either 500 ppm by a fresh water containing 500 ppm sodium chloride or 1000 ppm by a brine containing 20,000 ppm sodium chloride. The dilute PHPA properties of screen factor and viscosity are correlated with the reaction parameters and dilution conditions as shown in FIGS. 2 and 3.

The data indicate generally that decreasing the reaction temperature increases dilute PHPA properties until the initial reaction temperature reaches a breakpoint between about 38° and 43° C. Below the breakpoint, dilute PHPA properties level off or decrease slightly. However, above the breakpoint an interdependence between initial reaction temperature and initiator level diminishes the effect of temperature on dilute PHPA properties as initiator level increases. At relatively high initiator levels, i.e., at or above 800 ppm, initial temperature has little or no effect on dilute PHPA properties. These trends apply to both brine and fresh water PHPA solutions. Finally it is apparent that temperature does not effect viscosity and screen factor equally; the effect of varying temperature is stronger on screen factor than on viscosity.

EXAMPLE 3

Dilute PHPA solutions are manufactured in the manner of Example 2, but at a constant average reaction temperature of about 49° C. while varying the initial reaction parameters of monomer concentration and initiator level in the polymerization reactor. The dilute PHPA properties of screen factor and viscosity are correlated with the two reaction parameters and the dilution conditions as shown in FIGS. 4–7.

The data show that the initial monomer concentration has a very strong effect on dilute polymer properties between 4.5 and 7.5 wt % monomer. Raising the initial monomer concentration above about 7.5 wt % produces substantially no increase in dilute PHPA properties.

The data show that a breakpoint in the correlation between dilute PHPA properties and initiator level which is essentially independent of monomer concentration occurs at an initiator level of about 500 ppm. Below the breakpoint, the effect on dilute PHPA properties of varying the initiator level is very strong and above the breakpoint, the effect is very weak.

EXAMPLE 4

Acrylamide monomer is polymerized using ammonium persulfate in a polymerization reactor. Values of the initial reaction parameters are: monomer concentration=6.0 wt %; initiator level=400 ppm; and temperature=40.6° C. After about 30% hydrolysis, the product is a concentrated 6.5 wt % PHPA solution which is then diluted to a PHPA concentration of 1000 ppm with produced formation brine. At 22.2° C., the dilute PHPA solution has a viscosity of 8.6 cp and a screen factor of 27. The dilute PHPA solution is injected into the Tensleep Formation of the North Oregon Basin Field, Wyo., USA, as a drive fluid for a polymer flood and 5% additional oil is recovered.

Based on the results of this flood, it is determined that the performance demands of the formation require a PHPA flood with a higher screen factor to increase the amount of oil recovered and/or decrease the amount of PHPA injected.

Values of the polymerization reaction parameters are selected using the correlation of Examples 1-3 to obtain a dilute PHPA solution having properties which satisfy the performance demands of the formation. Values of the initial reaction parameters are: monomer concentration=7.5 wt %; initiator level=200 ppm; and temperature=47.8° C. The hydrolysis product, an 8.1 wt % PHPA solution, is diluted with the same formation brine as above, but to only one half of the concentration, i.e., 500 ppm. At 22.2° C., the dilute PHPA solution has a viscosity of 4.5 cp and a screen factor of 34. The solution is injected into an unflooded section of the same formation as above to facilitate oil recovery and the same amount of oil is recovered, but using only one half the total amount of PHPA.

While the foregoing preferred embodiment of the invention has been described and shown, it is understood that alternatives and modifications, such as those suggested and others may be made thereto and fall within the scope of the invention.

I claim:

1. A process for recoverying oil from a subterranean oil-bearing formation having performance demands comprising the steps of:
   determining said performance demands of said formation;
   determining correlations between an initial polymerization reaction parameter of initiator level and partially hydrolyzed polyacrylamide solution properties of screen factor and viscosity, each said correlation having a discontinuity;
   selecting a value of said initiator level below each said discontinuity such that said selected value of said initiator level is capable of producing a partially hydrolyzed polyacrylamide solution having values of said properties of viscosity and screen factor relatively sensitive to varying said initiator level and capable of meeting said performance demands of said formation;
   producing said partially hydrolyzed polyacrylamide solution having said values of said properties relatively sensitive to varying said initiator level and capable of meeting said performance demands by polymerizing an acrylamide monomer using a polymerization initiator at said selected value; and
   injecting said partially hydrolyzed polyacrylamide solution into said formation to improve oil recovery therefrom.

2. The process of claim 1 further comprising diluting said partially hydrolyzed polyacrylamide solution with an aqueous diluent to a concentration of about 50 to about 10,000 ppm before injecting said solution into said formation.

3. The process of claim 1 wherein said partially hydrolyzed polyacrylamide solution performs as a drive fluid for a polymer flood to improve oil recovery from said formation.

4. The process of claim 1 wherein said partially hydrolyzed polyacrylamide solution performs as a mobility buffer for a micellar flood to improve oil recovery from said formation.

5. The process of claim 1 wherein said partially hydrolyzed polyacrylamide solution performs as a gel component for a vertical conformance control gel to improve oil recovery from said formation.

6. The process of claim 1 further comprising selecting a value of an initial monomer concentration from about 3.0 to about 15.0 percent by weight.

7. The process of claim 6 further comprising selecting a value of an initial monomer concentration from about 4.5 to about 7.5 percent by weight.

8. The process of claim 1 further comprising selecting a value of an initial reaction temperature greater than about 27° C.

9. The process of claim 8 further comprising selecting a value of an initial reaction temperature from about 32° to about 49° C.

10. The process of claim 1 wherein said value of said initial initiator concentration is selected from about 50 to about 3000 ppm.

11. The process of claim 10 wherein said value of said initial initiator concentration is selected from about 50 to about 500 ppm.

12. In a process for producing a partially hydrolyzed polyacrylamide solution having predetermined properties of screen factor and viscosity based on the performance demands of a subterranean oil-bearing formation, wherein an acrylamide monomer is polymerized using a polymerization initiator to form said partially hydrolyzed polyacrylamide solution, the improvement comprising:
   determining correlations between an initial polymerization reaction parameters of initiator level and partially hydrolyzed polyacrylamide solution properties of screen factor and viscosity, each said correlation having a discontinuity;
   selecting a value of said initiator level below each said discontinuity such that said selected value of said initiator level is capable of producing said partially hydrolyzed polyacrylamide solution having said predetermined properties of screen factor and viscosity relatively sensitive to varying said initiator level; and
   producing said partially hydrolyzed polyacrylamide solution having said predetermined properties of screen factor and viscosity relatively sensitive to varying said initiator level by polymerizing said monomer using said initiator at said selected value.

13. The process of claim 12 further comprising selecting a value of an initial monomer concentration from about 3.0 to about 15.0 percent by weight.

14. The process of claim 13 further comprising selecting a value of an initial monomer concentration from about 4.5 to about 7.5 percent by weight.

15. The process of claim 12 further comprising selecting a value of an initial reaction temperature greater than about 27° C.

16. The process of claim 15 further comprising selecting a value of an initial reaction temperature from about 32° to about 49° C.

17. The process of claim 12 wherein said value of said initial initiator concentration is selected from about 50 to about 3000 ppm.

18. The process of claim 17 wherein said value of said initial initiator concentration is selected from about 50 to about 500 ppm.

* * * * *